T. HAGMAN.
SAFETY CLUTCH.
APPLICATION FILED FEB. 27, 1909.

964,774.

Patented July 19, 1910.
2 SHEETS—SHEET 1.

WITNESSES:
Chas. F. Young.
May Baxter.

INVENTOR
Theodor Hagman
BY
Parsons Hall & Bodell
ATTORNEYS

T. HAGMAN.
SAFETY CLUTCH.
APPLICATION FILED FEB. 27, 1909.

964,774.

Patented July 19, 1910.
2 SHEETS—SHEET 2.

WITNESSES:
Chas H Young
May Baxter

INVENTOR
Theodor Hagman
BY
Parsons Hall & Bodell
ATTORNEYS

UNITED STATES PATENT OFFICE.

THEODOR HAGMAN, OF SYRACUSE, NEW YORK.

SAFETY-CLUTCH.

964,774.  Specification of Letters Patent.  Patented July 19, 1910.

Application filed February 27, 1909. Serial No. 480,452.

*To all whom it may concern:*

Be it known that I, THEODOR HAGMAN, a subject of the King of Sweden, and a resident of Syracuse, in the county of Onondaga and State of New York, have invented a certain new and useful Safety-Clutch, of which the following is a specification.

My invention has for its object the production of a particularly simple and efficient safety clutch for coupling the main, or driving member and driven member in a factory, which can be operated to uncouple the driving and driven members in case of accident or on any other occasion; and it consists in the combinations and constructions hereinafter set forth and claimed.

In describing this invention, reference is had to the accompanying drawing in which like characters designate corresponding parts in all the views.

Figure 1:
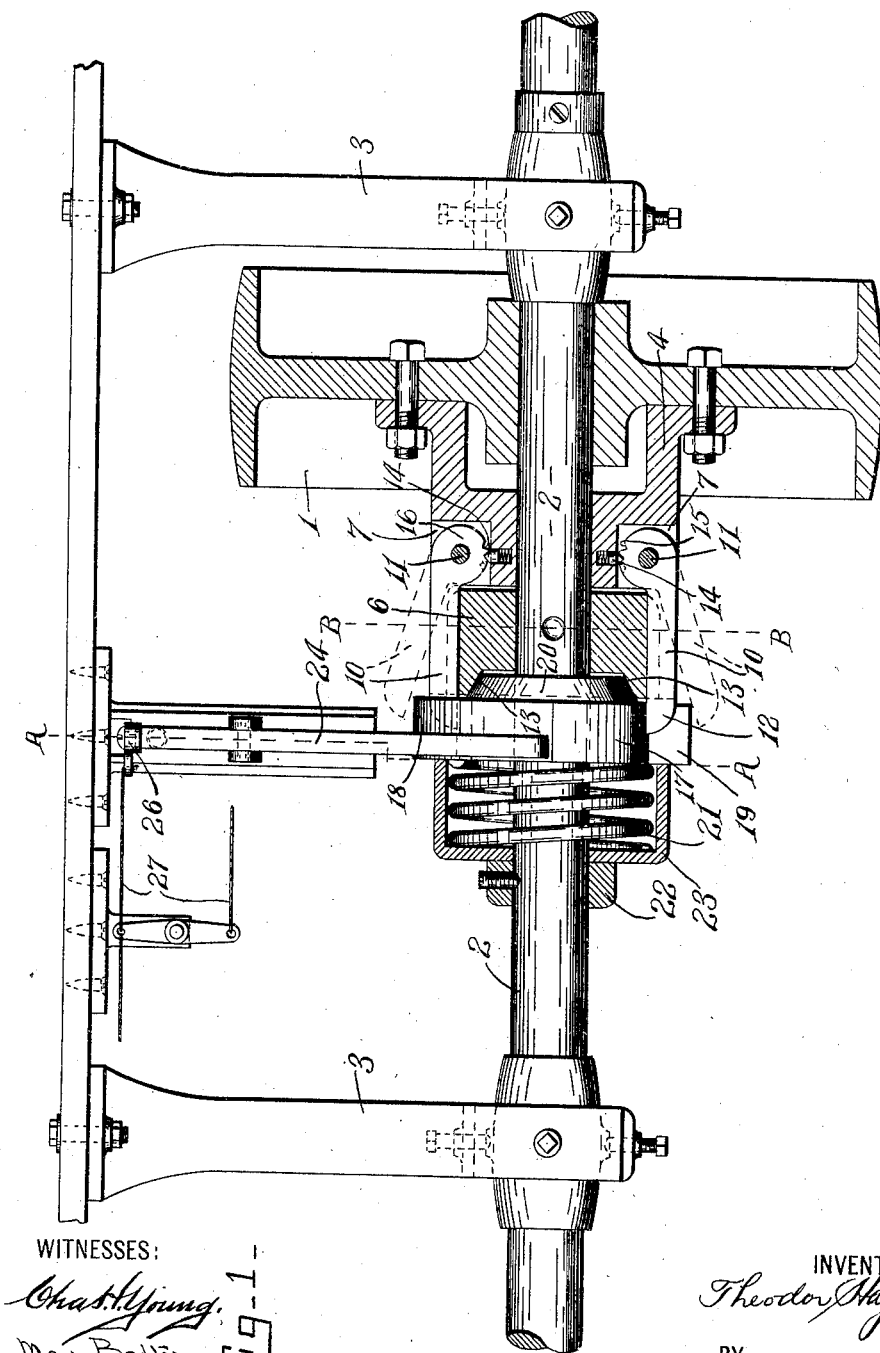
Figure 2:
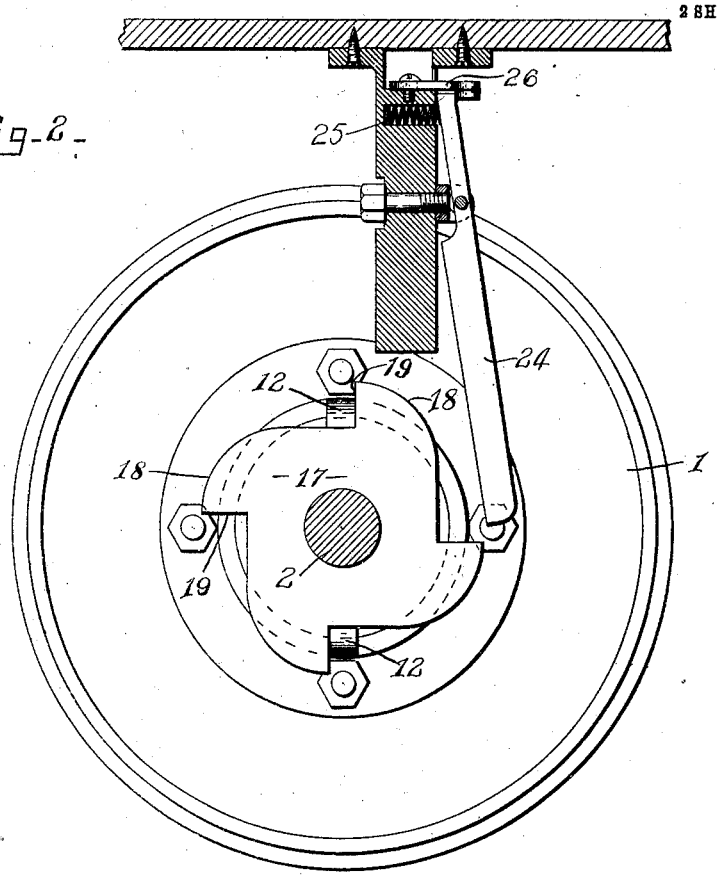
Figure 3:
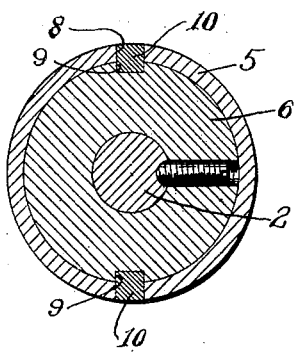

Figure 1 is a sectional view, partly in elevation, of the driving and driven members and adjacent parts, and the clutch coupling said members. Figs. 2 and 3 are sectional views taken, respectively, on lines A—A and B—B, Fig. 1.

This invention comprises, generally, driving and driven members, and a safety clutch coupling said members comprising means whereby the driving and driven members may be uncoupled, at will, by the movement of the driving member.

1 and 2 are respectively, driving and driven members arranged in axial alinement, the driving member being here shown as a pulley mounted on the driven member 2, which is shown as a shaft supported by suitable hangers 3. It will be understood, however, that this invention is not limited to a pulley driving member and a shaft driven member.

The driving and driven members are coupled together by a safety clutch comprising a key for normally locking the members 1 and 2 together, a cam for coacting with the key and forcing the same out of operative position, the cam being mounted on one of said members and normally rotatable therewith, and a stop for engaging the cam and preventing rotation thereof and thereby causing the same to force the key out of operative position, the stop being non-revoluble with the driving and driven members and being normally held out of position to engage the cam, and being operable at will, from various parts of the room or factory, in order to move it into position to stop the cam.

As here illustrated, one of the rotatable members, here shown as the driving member 1, comprises a portion 4 formed with an axial socket which provides a sleeve 5, and the other rotatable member, here shown as the driven member 2, comprises an enlarged portion 6 located contiguous to the portion 4 of the driving member and arranged in and fitted to the sleeve 5. The portion 4 and the sleeve 5 are formed, respectively, with a pair of peripheral recesses 7 and lengthwise slots 8 alined with the grooves 7, the slots 8 opening through the end of the sleeve, and one slot and groove being located diametrically opposite to the other slot and groove; and the portion 6 of the driven member is also provided with lengthwise grooves or key-ways 9 alined with the slots 8. My clutch is preferably provided with two keys 10 which are pivoted at 11 in the recesses or grooves 7 of the driving member and extend into the slots 8 and into the grooves 9, formed in the enlarged portion 6 of the driven member 2. The keys fit the slots 8, grooves 9 and recesses 7, and the outer surfaces of the keys are flush with the outer surfaces of the driving member and sleeve thus avoiding any projecting parts upon which a workman is liable to be caught. The fact that the keys are arranged in grooves and slots and fit the grooves and slots also adapts the clutch to transmit motion in either direction, it being necessary only when changing the operation thereof to reverse the cam and the stop to be described. The extremities 12 of the keys 10 project beyond the end of the sleeve 5 and the end of the portion 6, and overhang the smaller part of the driven member 2. Said portion 6 is also formed with a conical brake surface 13 at the outer end of the socket formed by the sleeve 5, and is usually a collar fixed in any suitable manner to the shaft 2. The keys 10 are normally arranged in the slots 8 and grooves 9, are movable outwardly on their pivots 11 into the position indicated by dotted lines, Fig. 1, in order to uncouple the driving and driven members, and are held in their operative and inoperative positions by two spring-pressed locking members 14 which enter notches 15 formed in disk-shaped portions 16 of the keys, arranged concentric with the pivots 11 thereof.

The cam 17 is mounted on the smaller part of the driven member 2 and normally rotates therewith, and is here shown as formed with a plurality of points here shown as four, each point having a curved surface 18 for coacting with the overhanging extremities 12 of the keys 10, and with a flat surface 19 extending in a radial direction with the axis of the shaft 2. The cam 17 is also formed with a conical brake surface 20 for engaging the brake surface 13 of the part or collar 6, and is pressed toward said surface by a coiled spring 21 arranged between said cam and an abutment, as a collar 22, fixed to the shaft 2. The cam is held from axial movement against the action of the spring by a case 23, one end of which engages said abutment 22 and the opposite end of which engages the side face of the cam 17.

The stop 24 for preventing rotation of the cam is movable into the path of the radially arranged faces 19 of the points of the cam 17, by a spring 25, and is normally held from movement by a trigger 26 which is operated by cords 27 extending to various parts of the room or factory.

In operation, when it is desired to quickly stop the driven shaft 2, or any machine connected thereto, one of the cords 27 is pulled in order to release the stop 24 and permit it to move into engagement with one of the radial faces 19 of the cam 17 and thereby prevent further rotation thereof with the driven member 2. Continued rotation of the driving member 1 carries the keys 10 therewith, causing the keys 10 to ride on the cam faces 18 of two of the points of the cam 17 and be forced thereby out of the grooves 9 and slots 8, so that the shaft 2 is uncoupled from the driving member or pulley 1. When the driving and driven members are thus disconnected, the engaged brake surfaces 13 and 20, one of which as 20, is now fixed and the other 13 moving, cause a quick stoppage of the driven member 2.

What I claim is:—

1. The combination with driving and driven rotatable members arranged in axial alinement, one of said members being formed with a sleeve having a lengthwise slot and the other of said members having a portion extended into and fitted to the sleeve and formed with a lengthwise groove normally alined with the slot of the sleeve, and the last-mentioned member also having a part of less diameter than the portion located in the sleeve, a key normally extending into said slot and groove and overhanging the smaller part of said other member, a cam for coacting with the overhanging part of the key, the cam being loosely mounted on said smaller part and normally rotatable therewith, and a stop non-revoluble with the driving and driven members and movable into engagement with the cam for preventing rotation thereof and causing the same to force the key out of the slot and grooves, substantially as and for the purpose specified.

2. The combination with driving and driven rotatable members arranged in axial alinement, one having a portion formed with an axial socket opening through one end thereof and thereby providing a sleeve, the sleeve being formed with a lengthwise slot, and the other of said members having a portion extended into the socket and formed with a groove normally alined with the slot formed in the sleeve, the last-mentioned member having a part of less diameter than the portion in the socket, a key pivoted to the socketed member, and normally extending into the slot and groove, the free end of the key overhanging the smaller part of said other member, a cam loosely mounted on said smaller part and normally rotatable therewith, and a stop non-revoluble with the driving and driven members and movable into engagement with the cam for preventing rotation thereof and causing the same to force the key out of the groove, substantially as and for the purpose set forth.

3. The combination with driving and driven rotatable members arranged in axial alinement, the driving member being formed with an axial socket opening through one end thereof and thereby forming a sleeve, the sleeve being formed with a lengthwise slot and the driving member being also formed with a groove alined with the slot, and the driven member having a portion arranged in the socket and formed with a groove normally alined with the slot of the sleeve, the driven member also having a part of less diameter than the socket, a key for normally locking said members together, the key being pivoted in the groove of the driving member and normally extending into the slot, and into the groove of the driven member, the free end of the key overhanging the smaller part of the driven member, a cam loosely mounted on said smaller part and normally rotatable therewith, and a stop non-revoluble with the driving and driven members and movable into engagement with the cam for preventing rotation thereof for causing the same to force the key out of the groove of the driven member, substantially as and for the purpose described.

In testimony whereof, I have hereunto signed my name in the presence of two attesting witnesses, at Syracuse, in the county of Onondaga, in the State of New York, this 15th day of February, 1909.

THEODOR HAGMAN.

Witnesses:
S. Davis,
H. Kaufman.